Oct. 30, 1934.  F. BARTLING  1,979,137
MANUFACTURE OF SODIUM CARBONATE, AMMONIUM CHLORIDE,
SODIUM NITRATE, AND HYDROCHLORIC ACID
Filed Aug. 4, 1931
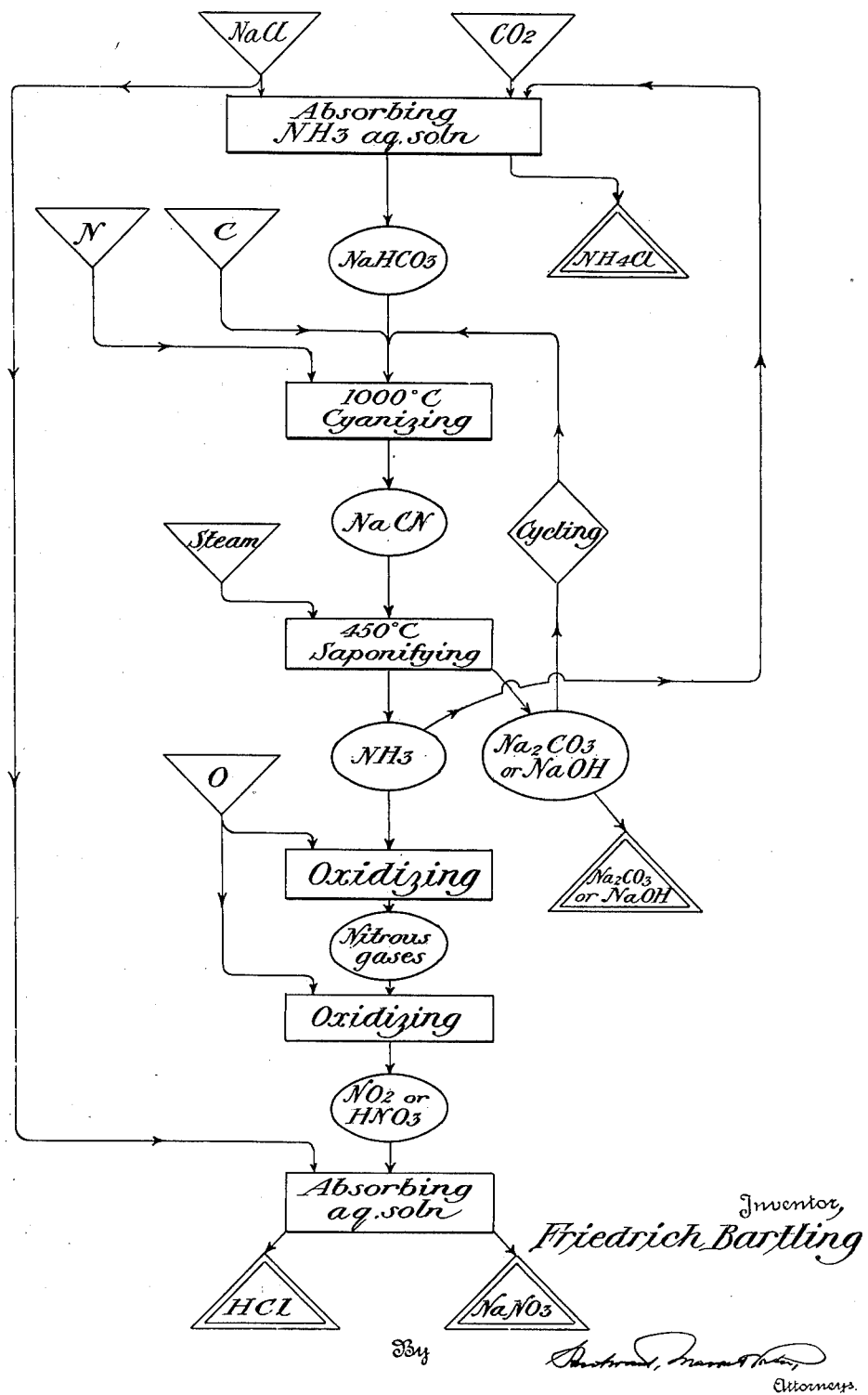
Inventor,
Friedrich Bartling Patented Oct. 30, 1934

1,979,137

UNITED STATES PATENT OFFICE 1,979,137

MANUFACTURE OF SODIUM CARBONATE, AMMONIUM CHLORIDE, SODIUM NITRATE, AND HYDROCHLORIC ACID

Friedrich Bartling, Huglfing, Germany; Jenny Bartling, Huglfing, executrix of said Friedrich Bartling, deceased, assignor to Alterum Kredit-Aktien-Gesellschaft, Berlin, Germany, a company of Germany Application August 4, 1931, Serial No. 555,140
In Germany August 15, 1930

2 Claims. (Cl. 23—102)

This invention relates to the manufacture of four valuable marketable products from a single cheap raw material—sodium chloride. According to the invention this manufacture is effected by a novel combination of well known process stages in a particularly simple manner. In the manufacture according to the invention of two fertilizers (ammonium chloride and sodium nitrate), sodium carbonate, and hydrochloric acid the production of waste by-products is avoided and it is unnecessary to supply any raw materials other than sodium chloride (in addition to carboniferous material and like auxiliary substances).

In carrying out the new process sodium bicarbonate is precipitated from an ammoniacal solution of common salt according to the well known ammonia soda process, when as is well known ammonium chloride is obtained in addition to the bicarbonate. The sodium bicarbonate after mixing with coal is then treated with nitrogen at high temperatures and sodium cyanide is thus formed, whereupon by passing steam at a lower temperature, the sodium cyanide is saponified and sodium carbonate or caustic soda together with ammonia, are thus obtained. This stage of the total process is repeated several times for the purpose of obtaining large quantities of ammonia. The ammonia thus produced is used according to the invention on the one hand for the continuous manufacture of ammonium chloride by introduction into the soda process, and on the other hand for producing nitrous gases by oxidation, in order to carry out the manufacture of sodium nitrate and hydrochloric acid by the reaction of these gases with freshly supplied sodium chloride.

The technical value of the whole process lies in the particularly favourable combination of a number of individual stages well known in themselves, by which four exceedingly valuable marketable products are produced from the cheap sodium chloride without any useless by-products. The processes hitherto known for the manufacture of sodium carbonate or ammonium chloride or sodium nitrate or hydrochloric acid involved the preparation of the individual products in a far less simple and advantageous manner than is possible by the combination according to the invention.

Thus for instance, in the soda industry the conversion of sodium bicarbonate into carbonate or further into caustic soda hitherto has been carried out in special, partly very expensive, process stages, without any further valuable products being obtained at the same time, whilst according to the invention ammonia is obtained during the said conversion. Also the manufacture of caustic soda has necessitated the production, as is well known, of carbonate of lime as a troublesome waste product.

The manufacture according to the invention, of nitrous gases from a part of the ammonia obtained during the conversion of the alkali cyanide compound into sodium carbonate, is particularly characteristic of the extreme simplification attained by the new process. The manufacture of ammonia, as a rule the most expensive part of a nitrogen oxide manufacturing installation, in combination with the soda and ammonium chloride manufacture, is converted into an exceedingly simple manufacture of by-products. The alkali required for fixing the nitrogen is supplied by the soda process, and the ammonia manufacturing stage of the process is in itself constituted by the conversion of the bicarbonate into carbonate or hydroxide. As moreover the process of nitrogen fixation already has to be carried out repeatedly in order to produce the quantity of ammonia which is utilized for the manufacture of ammonium chloride, (since the reaction does not always take place quantitatively), the increased production for the purpose of preparing nitrous gases is obtained within the total process with a surprisingly small expenditure. Moreover, the alkali which is unavoidably lost in practice (during the cyanidization and saponification) may be replaced in the simplest manner by the bicarbonate of the soda process.

It is thus obvious that the combination according to the invention of individual processes known in themselves produce altogether a surprising simplification as well as the best possible utilization of the raw material and of the apparatus.

Without departing from the scope of the invention it is possible, and in certain cases advantageous to oxidize the nitrogen oxides formed to nitrogen peroxide before causing them to act on the alkali chloride, or even to convert them into nitric acid.

The accompanying drawing shows a flow sheet indicating the course of the entering materials, and the successive operations thereon, with the removal of desired final products from the process.

*Example.*—According to the well known ammonia soda process, 800 gr. sodium bicarbonate was precipitated from an ammoniacal solution of common salt by passing in carbon dioxide. After filtration the salt was washed, dried and mixed with 1300 gr. of coke obtained by low temperature carbonization of brown coal (which coke contained 40% volatile ingredients and ash) and the whole was reduced to a fine powder.

A cyanidization was thereupon carried out at about 1000° C. in a current of nitrogen. The treatment was continued for three hours, during which time 1.5 kg. of nitrogen was caused to react.

After this treatment, the heating of the cyanidization vessel was reduced so that the contents of the vessel cooled down to about 450° C. At this temperature the mass was treated with steam, and the ammonia escaping during this treatment was absorbed in water.

The nitrogen treatment and the saponification were thereupon repeated twice in the same way in the same vessel with the same mass. This interruption of the returning of the sodium carbonate is thus accomplished prior to the substantial contamination of the valuable sodium with the silicates, aluminates, etc., of the ash, and hence a larger quantity of sodium carbonate is recovered, on the one hand, and on the other hand, the cyanidization and saponification steps are not impeded by the presence of any substantial accumulation of the ash from the coke and such sodium compounds therefrom, which do not take part in the reactions.

The vessel was thereupon emptied, and the reaction mass lixiviated with water. The solid constituents were then separated from the liquid by filtration, and the aqueous extract was evaporated. By evaporation 469.4 gr. $Na_2CO_3$ were obtained.

Of the ammonia obtained by the repeated saponification of the repeatedly produced cyanide, 170 gr. were transferred into the ammonia soda lye obtained during the precipitation of the sodium bicarbonate. It was thereupon possible to precipitate 478.5 gr. solid ammonium chloride by cooling.

The remainder of the ammonia produced during the repeated saponification of the cyanide was passed, after having been mixed with air, over heated iron-bismuth oxide and thus submitted to oxidation to nitrous gases. The nitrous gases after being mixed with oxygen were absorbed by means of a dilute sodium chloride solution.

The liquid thus obtained was allowed slowly to evaporate and the escaping gases were absorbed by cold water. After the process was finished, the cold water contained 115 gr. hydrochloric acid.

After complete evaporation of the sodium chloride solution which had been treated with the mixture of oxides of nitrogen and oxygen, there remained 356 gr. solid sodium nitrate.

I claim:

1. A process of manufacturing alkali metal carbonate ammonium chloride, alkali metal nitrate and hydrochloric acid, which comprises preparing a solution of alkali metal chloride, treating a first portion of the solution with ammonia and carbon dioxide to precipitate alkali metal bicarbonate and produce ammonium chloride, mixing the bicarbonate with carboniferous material containing ash components and cyanizing the mixture at high temperature with nitrogen, treating the product with steam for saponification to produce ammonia and alkali metal carbonate, mixing the carbonate with carboniferous material containing ash components and returning it for the cyanizing and saponification a limited number of times, continually introducing alkali metal bicarbonate with material for cyanizing and then withdrawing the carbonate whereby to restrict the accumulation of impurities from the ash components, passing a part of the ammonia into the liquor from said first portion of alkali metal chloride solution, oxidizing another part of the ammonia, maintaining an excess of oxygen with the oxidized product and absorbing the resultant nitrogen oxides into another portion of the alkali metal chloride solution whereby to produce hydrochloric acid and alkali metal nitrate.

2. A process of treating alkali metal chloride to produce ammonium chloride, alkali metal carbonate and ammonia, which comprises preparing a solution of alkali metal chloride, treating the solution with ammonia and carbon dioxide to precipitate alkali metal bicarbonate and produce ammonium chloride, mixing the bicarbonate with carboniferous material containing ash components, heating the mixture to high temperature in the presence of nitrogen whereby to cyanize the mixture, treating the product with steam for saponification whereby to produce ammonia and alkali metal carbonate, mixing the carbonate with carboniferous material containing ash components and returning it for cyanizing and saponification, continually introducing alkali metal bicarbonate with the material for cyanizing interrupting the return after a limited number of times whereby to restrict the accumulation of impurities from the ash of the carboniferous material, and withdrawing alkali metal carbonate from the product of the saponification.

FRIEDRICH BARTLING.